J. WIELAND.
VEHICLE BRAKE.
APPLICATION FILED FEB. 15, 1916.

1,221,937. Patented Apr. 10, 1917.

Inventor
J. WIELAND
N. S. ⟨illegible⟩
Attorney

UNITED STATES PATENT OFFICE.

JOZIAS WIELAND, OF CENTRAL LAKE, MICHIGAN.

VEHICLE-BRAKE.

1,221,937.     Specification of Letters Patent.     Patented Apr. 10, 1917.

Application filed February 15, 1916. Serial No. 78,352.

*To all whom it may concern:*

Be it known that I, JOZIAS WIELAND, a citizen of the United States, residing at Central Lake, in the county of Antrim, State of Michigan, have invented a new and useful Vehicle-Brake; and I do hereby declare the following to be a full, clear, and exact description of the invention, such as will enable others skilled in the art to which it appertains to make and use the same.

The present invention relates to certain new and useful improvements in vehicle brakes, and has for its object to provide a device of this character which embodies novel features of construction whereby the rear wheels can be locked against rotation to impede movement of the vehicle in either direction, thereby enabling the vehicle to be stopped on a hill for the purpose of resting the draft animals without the necessity of placing stones under the wheels, and also eliminating the necessity for using a chain for locking one of the wheels when going down hill.

Further objects of the invention are to provide a vehicle brake of this character which is comparatively simple and inexpensive in its construction, which can be readily mounted upon any conventional construction of vehicle, and which can be readily operated from the driver's seat.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Corresponding and like parts are referred to in the following description and indicated in all the views of the drawing by the same reference characters.

Figure 1:
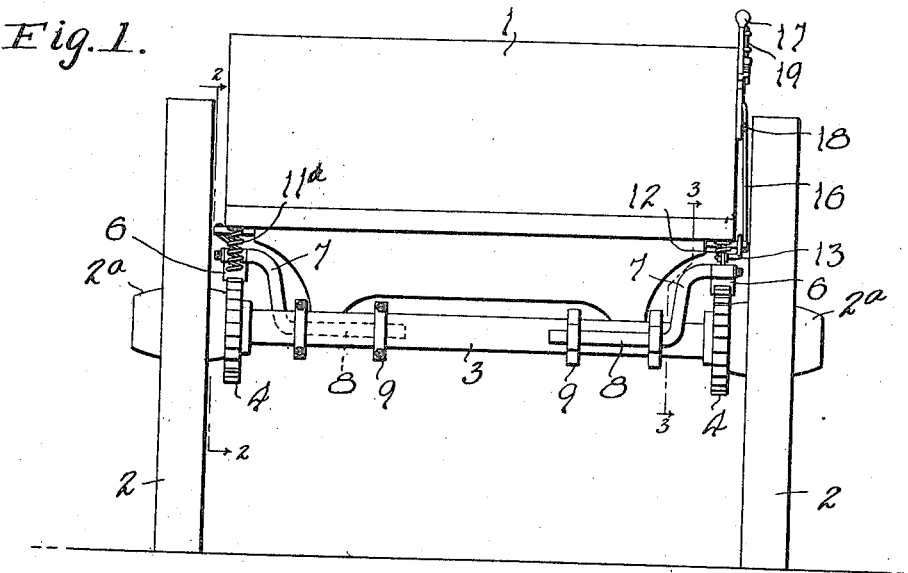
Figure 1 is a rear view of a vehicle provided with a brake constructed in accordance with the invention.
Figure 2:
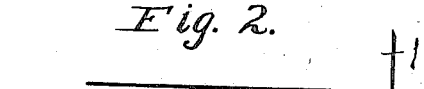
Fig. 2 is an enlarged sectional view through the hub of one of the wheels, taken on the line 2—2 of Fig. 1 and looking in the direction of the arrows.
Figure 3:
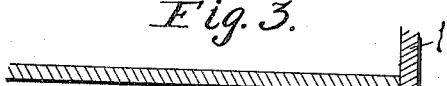
Fig. 3 is a similar sectional view through the hub of the other wheel, taken on the line 3—3 of Fig. 1, and looking in the direction of the arrows.
Figure 4:
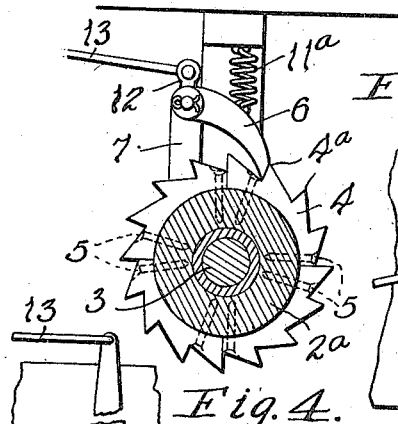
Fig. 4 is a bottom plan view of the wagon bed, showing the lever mechanism for controlling the brake pawls.
Figure 5:
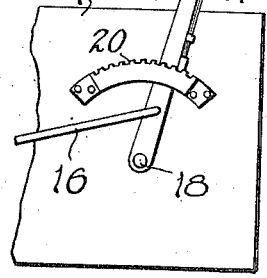
Fig. 5 is a side elevation of the brake pawl controlling lever.
Figure 6:
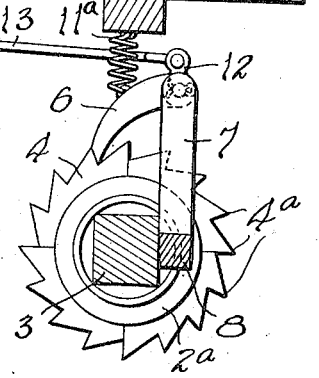
Fig. 6 is an enlarged sectional view through the rear axle, showing one of the clamp members employed for attaching the brake pawl supporting bars to the axle.

Referring to the drawings, the numeral 1 designates the vehicle body, and 2 the rear wheels which are mounted upon the axle 3, all of the said parts being of the conventional construction. The inner end of the hub $2^a$ of each of the wheels 2 is provided with a rack 4, said racks being provided with the inclined teeth $4^a$ and being formed in segmental sections which are fitted together and secured to the hub by suitable fastening members such as the screws 5. The teeth $4^a$ of the rack 4 upon one of the wheels are inclined in one direction, while the corresponding teeth $4^a$ of the rack 4 on the opposite wheel are inclined in the reverse direction. Pawls 6 are provided for coöperation with the teeth of the racks to lock the wheels against rotation, and it will be obvious that one of the pawls will lock one wheel when the vehicle is going forward, while the other pawl will lock the other wheel should the vehicle have a tendency to go backward.

These pawls 6 are pivotally mounted upon spindles at the extremities of curved bracket arms 7 formed by bending the outer ends of the supporting bars 8. These bars 8 extend longitudinally along the axle 3, being applied to opposite end portions thereof and held in position by the U-shaped clamps 9. The curved ends of the U-shaped clamps 9 are crimped at $9^a$ to receive the supporting bars 8, and the extremities of the arms of the U-shaped clips are capped by the nuts 10 which engage the cross bars 11. In this manner the bars 8 are securely clamped upon the axle 3 with the ends of the curved bracket arms 7 overhanging the racks 4. The brake pawls 6 are pivotally mounted upon the extremities of the bracket arms 7, and are normally held in inoperative position by tension springs $11^a$ which connect the same to the bed of the vehicle. It will be observed that the supporting bars 8 are arranged upon opposite sides of the rear axle 1, and that the pawls 6 face in opposite directions, one of the said pawls extending rearwardly, while the other pawl extends forwardly.

Means is provided for moving both of the brake pawls 6 simultaneously into operative position, thereby locking one of the rear wheels when the vehicle is going up hill and the other rear wheel when the vehicle is going down hill. Each of the brake pawls 6 is provided with a crank arm 12, said crank arms being connected by the links 13 to opposite ends of a transverse lever 14 which is arranged under the bed of the vehicle and is pivotally mounted at an intermediate point in its length, as indicated at 15. One end of this transverse lever 14 is connected by a forwardly extending link 16 to a hand lever 17 which is pivotally mounted at 18 upon one side of the vehicle body and adjacent the driver's seat. A latch 19 is provided for coöperation with the rack 20 to lock the hand lever 17 in an adjusted position. When the hand lever is at one limit of its movement, both of the wheel locking pawls 6 are lifted out of engagement with the respective racks 4 and held in an inoperative position. However, when the hand lever 17 is released and moved to the other limit of its movement, the transverse lever 14 is swung about its pivot and both of the wheel locking pawls 6 swung downwardly into positive engagement with the corresponding racks 4. The U-shaped clamping clips 9 can be constructed to fit any axle, and the sectional racks 4 can be fitted upon the hubs of any wheels, and it will be obvious that the brake mechanism can be readily applied to any conventional construction of vehicle without necessitating any mutilation or material changes therein.

Having thus described the invention, what I claim as new and desire to secure by Letters Patent, is:—

1. A wheel locking device for vehicles, including independent annular racks applied to the hubs of the respective rear wheels and having the teeth thereof inclined in opposite directions, a pair of outwardly and upwardly extended bracket arms projecting from the opposite end portions of the rear axle and terminating in horizontally disposed spindles which overhang the racks of the respective wheels, oppositely extending pawls pivotally mounted upon the spindles of the respective brackets and arranged for coöperation with the respective racks, yielding means normally holding the pawls in inoperative position, crank arms projecting from the pivot ends of the pawls, a transverse lever pivotally mounted between its ends and having its ends operatively connected to the crank arms of the respective pawls, and means for swinging the transverse lever to simultaneously lower the pawls into inoperative position against the action of the before mentioned yielding means.

2. A wheel locking attachment for standard vehicles, including an annular rack formed in independent abutting segmental sections and adapted to be assembled around one of the rear wheel hubs, a bar extending longitudinally of the rear axle and fitting against the same, one end of the bar being formed with an upwardly curved bracket terminating in a spindle which overhangs the rack, clips fitting around the bar and axle and securing the bar in position, a pawl pivotally mounted upon the spindle and arranged for engagement with the rack to lock the wheel, yielding means normally holding the pawl in inoperative position, and means for lowering the pawl into operative position.

In testimony whereof I have signed my name to this specification in the presence of two subscribing witnesses.

JOZIAS WIELAND.

Witnesses:
G. C. TOWNSEND,
STUART BAAR.

Copies of this patent may be obtained for five cents each, by addressing the "Commissioner of Patents, Washington, D. C."